United States Patent
Sasaki et al.

(10) Patent No.: US 9,965,732 B2
(45) Date of Patent: May 8, 2018

(54) COMPUTER READABLE RECORDING MEDIUM, ROADWORK PLANNING METHOD AND INFORMATION PROCESSING APPARATUS

(71) Applicant: FUJITSU LIMITED, Kawasaki-shi, Kanagawa (JP)

(72) Inventors: Hiroshi Sasaki, Meguro (JP); Hiroyuki Tani, Katsushika (JP); Sei Masuda, Kagoshima (JP); Shinichi Tani, Oota (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/647,802

(22) Filed: Jul. 12, 2017

(65) Prior Publication Data
US 2017/0308827 A1    Oct. 26, 2017

Related U.S. Application Data

(63) Continuation of application No. PCT/JP2016/050399, filed on Jan. 7, 2016.

(30) Foreign Application Priority Data

Jan. 16, 2015  (JP) ................. 2015-007226

(51) Int. Cl.
*G06Q 10/06* (2012.01)
*G06Q 50/26* (2012.01)
(Continued)

(52) U.S. Cl.
CPC ......... *G06Q 10/0631* (2013.01); *E01C 1/002* (2013.01); *G06Q 10/06311* (2013.01);
(Continued)

(58) Field of Classification Search
CPC ............... G06Q 10/0631; G06Q 50/26; G06Q 10/06311; G06Q 10/06375; G06Q 10/08; G06Q 10/087; G09B 29/10; E01C 1/002
See application file for complete search history.

(56) References Cited

U.S. PATENT DOCUMENTS

2006/0106531 A1* 5/2006 Nagase ................ G08G 1/0104
701/532
2006/0235739 A1* 10/2006 Levis ..................... G06Q 10/08
705/1.1
(Continued)

FOREIGN PATENT DOCUMENTS

JP    2000-96547     4/2000
JP    2002-297708   10/2002
(Continued)

OTHER PUBLICATIONS

International Search Report dated Mar. 8, 2016 in corresponding International Patent Application No. PCT/JP2016/050399.

*Primary Examiner* — Richard M Camby

(57) ABSTRACT

A non-transitory computer readable recording medium has stored therein a program that causes a computer to execute a process including displaying a screen on which it is possible to set an area affected by a characteristic of a road around a specific facility, which is the area set based on the facility; and displaying, on a graphic, information specifying a section of road that is contained in the area affected by the characteristic relating to the specific facility on the displayed screen and that is affected by a possible selected type of repair work on the road according to the fact that the section belongs to the affected area.

12 Claims, 8 Drawing Sheets

(51) Int. Cl.
  *G09B 29/10* (2006.01)
  *E01C 1/00* (2006.01)
  *G06Q 10/08* (2012.01)

(52) U.S. Cl.
  CPC ....... *G06Q 10/06375* (2013.01); *G06Q 50/26* (2013.01); *G09B 29/10* (2013.01); *G06Q 10/08* (2013.01); *G06Q 10/087* (2013.01)

(56) References Cited

U.S. PATENT DOCUMENTS

| | | |
|---|---|---|
| 2010/0235203 A1 | 9/2010 | Baskin et al. |
| 2013/0007501 A1 | 1/2013 | Areal et al. |
| 2015/0242788 A1* | 8/2015 | Wu-Emmert .... G06Q 10/06316 705/7.26 |
| 2016/0224029 A1* | 8/2016 | Tojima ................. G05D 1/0278 |

FOREIGN PATENT DOCUMENTS

| | | |
|---|---|---|
| JP | 2004-220586 | 8/2004 |
| JP | 2005-115687 | 4/2005 |
| JP | 2005-182646 | 7/2005 |
| JP | 2008-59376 | 3/2008 |
| WO | WO 2006/109798 A1 | 10/2006 |

\* cited by examiner

COMPUTER READABLE RECORDING MEDIUM, ROADWORK PLANNING METHOD AND INFORMATION PROCESSING APPARATUS

CROSS-REFERENCE TO RELATED APPLICATION

This application is a continuation of International Application No. PCT/JP2016/050399, filed on Jan. 7, 2016, which is based upon and claims the benefit of priority of the prior Japanese Patent Application No. 2015-7226, filed on Jan. 16, 2015, the entire contents of which are incorporated herein by reference.

FIELD

The embodiment discussed herein is related to a computer readable recording medium, a roadwork planning method and an information processing apparatus.

BACKGROUND

Most of roads are managed by local public entities, such as prefectural governments and city governments. Local public entities carry out works to repair degraded roads (also referred to as routes) within limited budgets and maintain roads to be managed. For this reason, when implementing the budgets, local public entities allocate the budgets according to the condition of the degraded roads and draw up plans for roadworks.

Patent Document 1: Japanese Laid-open Patent Publication No. 2008-59376

It is however difficult to, when drawing up a plan for roadworks, check whether each section of a route belongs to an affected area that is an area based on a specific facility and that affects the type of roadwork.

For example, when roadworks are planned, a type of roadwork is specified for each section in consideration of the circumstances that differ with respect to each section of the route, such as the level of degradation and importance. For example, the importance of the road is high in a section near an important facility, such as a station or a hospital, and thus it is preferable to select a roadwork enabling long durable years after the roadwork. Thus, it is important to check whether each section of a route belongs to an area based on an important facility; however, this checking work is not easy.

SUMMARY

According to an aspect of an embodiment, a non-transitory computer readable recording medium has stored therein a program that causes a computer to execute a process including displaying a screen on which it is possible to set an area affected by a characteristic of a road around a specific facility, which is the area set based on the facility and displaying, on a graphic, information specifying a section of road that is contained in the area affected by the characteristic relating to the specific facility on the displayed screen and that is affected by a possible selected type of repair work on the road according to the fact that the section belongs to the affected area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
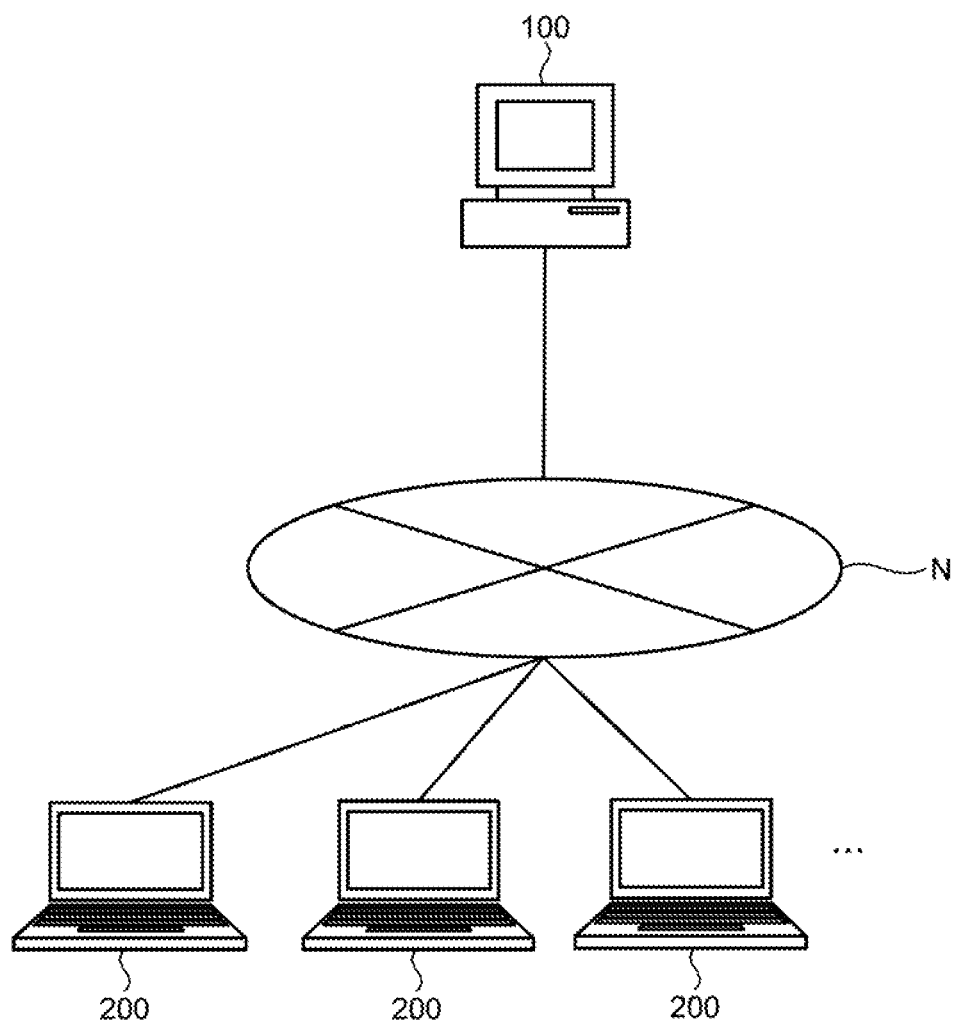
FIG. 1 is an illustration diagram illustrating an exemplary system configuration.

Preferred embodiments of the present invention will be explained with reference to accompanying drawings. Components having the same functions in the embodiment will be denoted with the same reference numerals and redundant descriptions will be omitted. The roadwork planning program, the roadwork planning method and the information processing apparatus of the embodiment described below represent an example only and do not limit the embodiments. The following embodiments may be combined as appropriate as long as no discrepancy is caused.

FIG. 1 is an illustration diagram illustrating an exemplary system configuration. As illustrated in FIG. 1, an information processing apparatus 100 according to the embodiment is, for example, a server device enabling communication with terminal devices 200 via a network N, such as a local area network (LAN) or the Internet. The terminal device 200 is, for example, a personal computer (PC). The central processing units (CPU) of the information processing apparatus 100 and the terminal device 200 execute a program and thus the information processing apparatus 100 and the terminal device 200 execute various processes (details of the hardware configuration will be described below). Specifically, the CPU of the information processing apparatus 100 executes the program and thus the information processing apparatus 100 performs various processes relating to a roadwork plan. Furthermore, the CPU of the terminal device 200 executes the program and thus the terminal device 200 requests communication with the information processing apparatus 100, requests the information processing apparatus 100 to perform various processes, and performs, for example, a graphical user interface (GUI) processing to display the result of the requests.

For example, a user, such as a member of a local public entity, performs an operation to login the information processing apparatus 100 from the terminal device 200 to request the information processing apparatus 100 to cause the terminal device 200 to display a GUI screen for performing various operations relating to a roadwork plan. The user then requests the information processing apparatus 100 to perform various processes relating to the roadwork plan from the GUI screen displayed on the terminal device 200. The information processing apparatus 100 executes various processes relating to the roadwork plan according to the request for the processes that is received from the terminal device 200 and outputs the result of the processes to the terminal device 200. In this manner, the user is able to implement a task relating to the drawing up of the roadwork plan on the terminal device 200. The information processing apparatus 100 may have a function of performing the GUI processing and thus receive a request for various processes relating to budget allocation from the user via the input device and display the result of the processes on the monitor.

Figure 2:
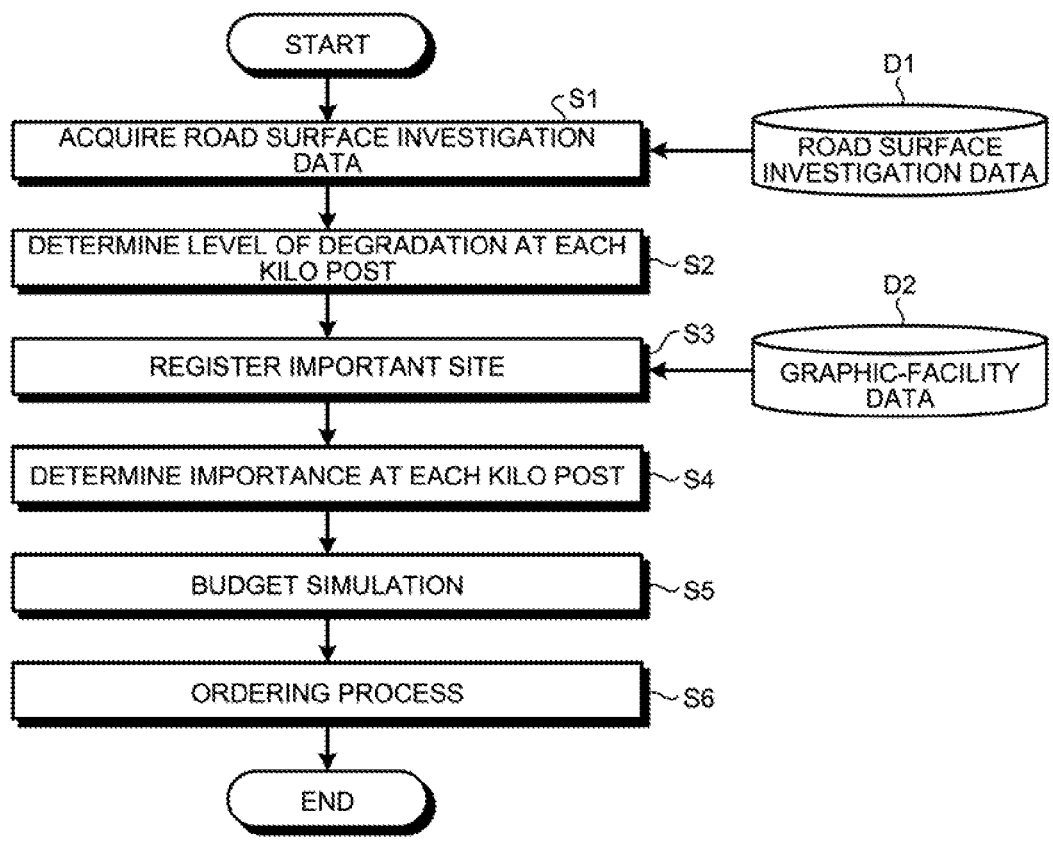
FIG. 2 is a flowchart illustrating exemplary operations of an information processing apparatus according to an embodiment.

FIG. 2 is a flowchart illustrating exemplary operations of the information processing apparatus 100 according to the embodiment. The CPU of the information processing apparatus 100 executes the program and thus the information processing apparatus 100 executes the various processes at S1 to S6 illustrated in FIG. 2.

First of all, the information processing apparatus 100 acquires road surface investigation data D1 from a storage, such as a hard disk device (S1). The road surface investigation data D1 is data representing an investigation result of investigating the reality of roads managed by the local public entity. In the road surface investigation data D1, at least information representing the level of degradation of road surface and information representing the amount of traffic of vehicles traveling on the roads per unit of time are described with respect to each section of the roads (kilo post).

The information representing the level of degradation of road surface in the road surface investigation data D1 may be, for example, data obtained by evaluating the level of degradation by stage when an investigator investigates the road surface at each kilo post. The information representing the level of degradation of road surface may be imaging data obtained by imaging the road surface at each kilo post with a camera. The imaging data obtained at each kilo post may be collected with a global positioning system (GPS) and by causing a vehicle for investigation on which a camera for imaging the road surface is mounted to travel.

The information representing the amount of traffic in the road surface investigation data D1 may come of investigation on the amount of traffic at each kilo post performed by the investigator. The information representing the amount of traffic may be a value obtained by counting vehicles passing through from the imaging data obtained with a fixed point camera that is arranged in a given position on the road. The amount of traffic may be collected according to each type of vehicle, for example, passenger cars or trucks, and according to each time band, for example, daytime or nighttime.

The information processing apparatus 100 determines the level of degradation of the road surface (for example, five-stage evaluation or point evaluation) at each kilo post on the basis of information representing the level of degradation contained in the acquired road surface data D1 (S2). Specifically, when it is data from the evaluating of the level of degradation by stage by the investigator, the evaluation is determined as the level of degradation. When it is imaging data obtained by imaging the road surface, the imaging data may be displayed on, for example, a monitor and the evaluation by the user may be received from an input device and determined. The information processing apparatus 100 recognizes the state of the road surface by stage from the imaging data obtained by imaging the road surface by performing known image recognition processing and determines the result of the recognition as the level of degradation.

The information processing apparatus 100 then receives registration of a specific facility (hereinafter, referred to as an important spot) that affects the type of roadwork (S3). The GUI that registers the important spot registers the important spot by displaying a graphic based on graphic-facility data D2 that is read from a storage, such as a hard disk device, and receiving the specifying of the important spot from the user.

The graphic-facility data D2 is data in which the graphic of the area managed by the local public entity, the position of the road, and information on an environment, such as a facility on the graphic, are described. Specifically, in the graphic-facility data D2, the position of each kilo post on the road managed by the local public entity and the area thereof are described by using the latitude and amplitude and an address. In the graphic-facility data D2, the position (the latitude, amplitude and address) of the facility on the graphic and information representing the types of facility, such as school, hospital or municipal office, are described. The information on the environment on the graphic may be any data as long as the information is data representing the environment obtained by investigating the position (the latitude, amplitude and address) on the graphic. For example, the information may be demographic statistics (daytime population, nighttime population, etc.), traffic accidents and the causes thereof (such as sudden braking and over-speeding), the use district (residential area, commercial area, etc.) according to the city planning law, multi-lane roads, one-way roads, etc.

Figure 3:
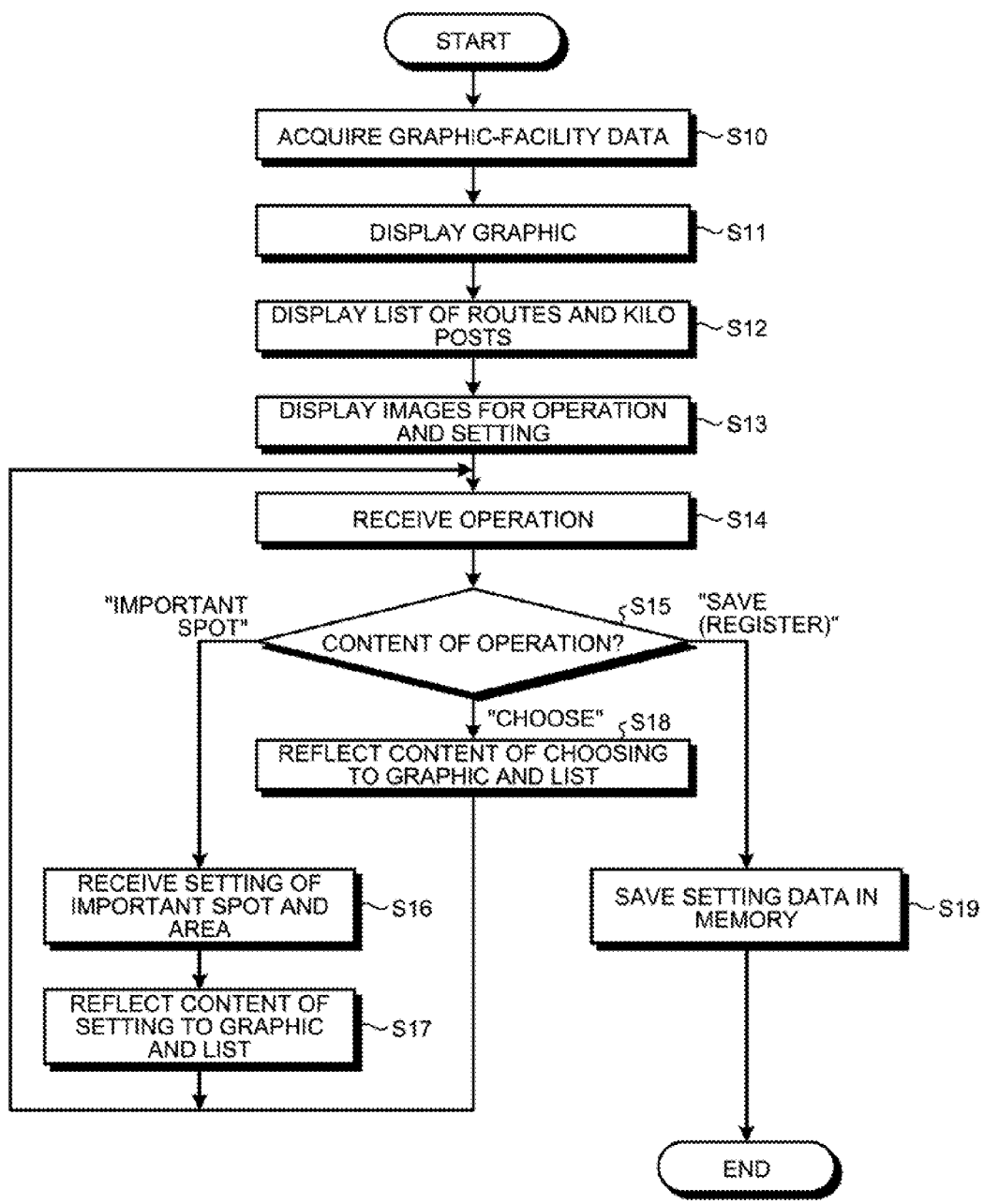
FIG. 3 is a flowchart illustrating exemplary operations relating to registration of an important spot.

Details of registration of an important spot (S3) will be described. FIG. 3 is a flowchart illustrating exemplary operations relating to registration of an important spot.

As illustrated in FIG. 3, when registration of an important spot is started, the information processing apparatus 100 reads the graphic-facility data D2 (S10) and displays a graphic illustrating stations, railways, brides, facilities, such as hospitals, routes, and natural structures, such as rivers and mountains, in a given reduced scale on the display screen (S11).

The information processing apparatus 100 then displays a list of routes displayed on the graphic and kilo posts on the routes on the GUI display screen with reference to the graphic-facility data D2 (S12). The information processing apparatus 100 further displays images for operation and setting, such as button icons and signs, on the GUI display screen (S13).

Figure 4:
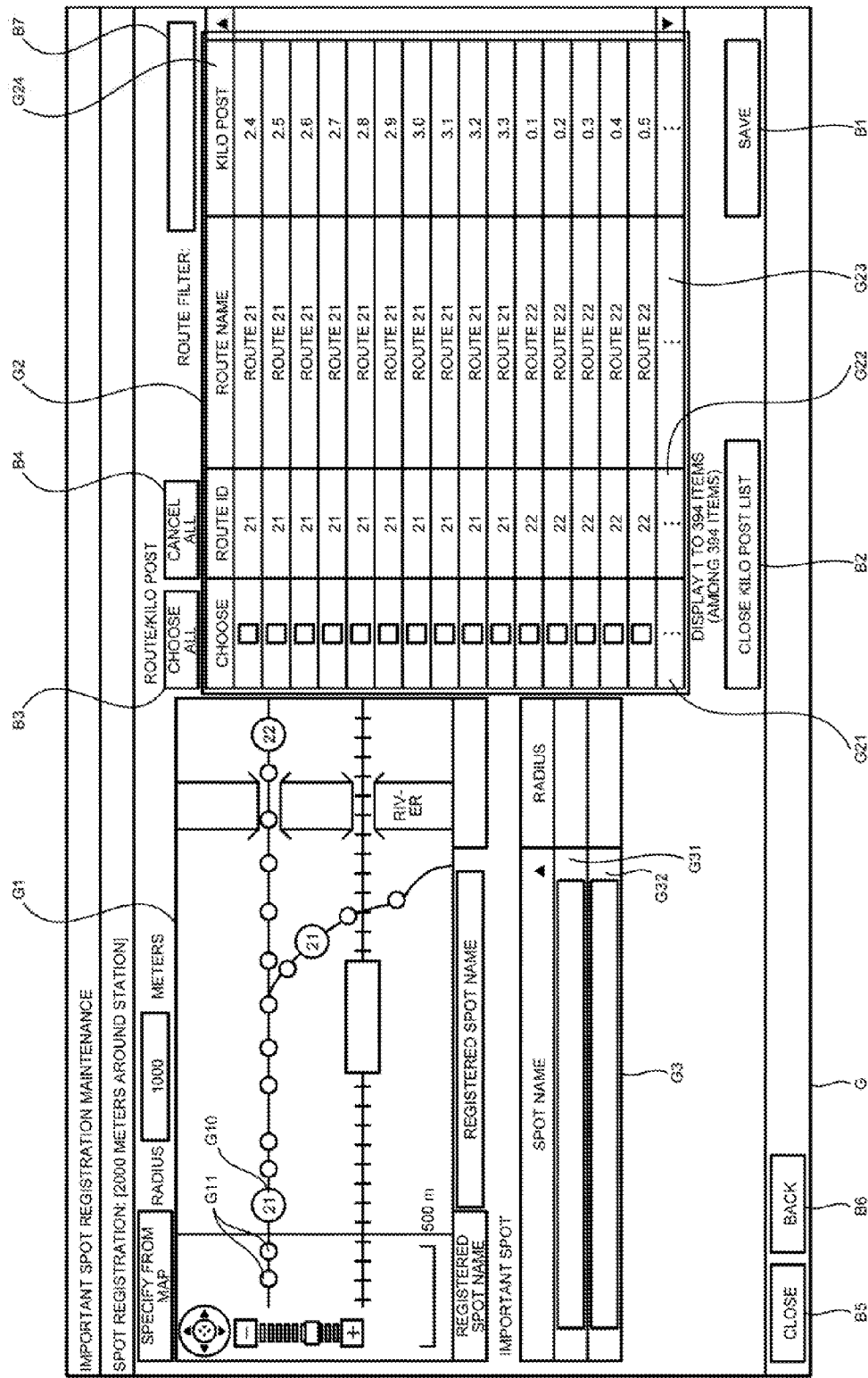
FIG. 4 is an illustration diagram illustrating a display screen.

FIG. 4 is an illustration diagram illustrating the display screen G. As illustrated in FIG. 4, the display screen G includes a graphic display G1, a list display G2, and a setting display G3. The display screen G includes operation buttons B1, B2, B3, B4, B5 and B6 and an input box B7.

The graphic display G1 is a graphic displayed with reference to the graphic-facility data D2. The graphic display G1 displays facilities, routes and natural structures in the given reduced scale. With respect to the routes on the graphic display G1, route names G10 corresponding to routes and kilo post signs G11 corresponding to respective kilo posts are displayed. The route names G10 and the kilo post signs G11 enable the user to distinguish between routes and check the positions of the kilo posts.

The setting display G3 receives the setting of an important spot and an area affected by the important spot. Specifically, the information processing apparatus 100 acquires the list of facilities on the graphic from the graphic-facility data D2 and receives the choosing of a facility serving as an important spot in a spot-name section. The information processing apparatus 100 then receives setting a radius of a circle about the important spot that is set in the spot-name section as the affected area in a radius section.

The setting of an important spot and an area that is affected by the important spot described above is an example only and is not particularly limited. For example, specifying an important spot may be specifying a given spot on the graphic on the graphic display G1. In this case, an input of a name of a facility that is specified as an important spot may be received in the spot-name section. Furthermore, the area affected by the important spot that is set may be an area where the distance from the important spot is a given distance or a section (town or address) containing the important spot. It is possible to calculate the area where the distance from the important spot is the given distance and the section containing the important spot with reference to the graphic-facility data D2 on the basis of the specified important spot.

The operation button B1 is a button for issuing an instruction to save the choosing setting in a column G21 on whether to set each kilo post as a kilo post affected by the important spot. The information processing apparatus 100 receives an operation on the operation button B1 and accordingly saves the setting on whether each kilo post is a kilo post affected by the important spot as setting data.

The operation button B2 is a button for issuing an instruction to close the list of kilo posts on the list display G2. The operation buttons B3 and B4 are buttons for issuing instructions for collective choosing or collective canceling in the column G21.

The operation button B5 is a button that receives an instruction to end the process without saving the setting on whether each kilo post is a kilo post affected by the important spot as setting data. The information processing apparatus 100 ends the process without saving the setting data in response to the receiving of the operation on the operation button B5. The operation button B6 is a button that receives an instruction to return to the previous process. The information processing apparatus 100 returns to the last previous process in response to the receiving of the operation on the operation button B6. For example, the information processing apparatus 100 keeps the history of operations, such as the choosing setting, in the memory and, when receiving an operation on the operation button B6, returns to the state where the last previous operation is performed according to the memory history.

The input box B7 is a box that receives an input of, for example, a route name to receive the specifying of a route.

FIG. 3 will be referred back. After S13, the information processing apparatus 100 receives an operation on the graphic display G1 on the GUI (S14) and determines the content of the received operation (S15). The GUI operation covers, for example, "important spot" for setting an important spot and an area affected by the important spot on the setting display G3.

In the case of this "important spot", the information processing apparatus 100 receives the setting of an important spot and an area affected by the important spot (S16) and reflects the content of the received setting to the graphic display G1 and the list display G2 (S17).

Figure 5:
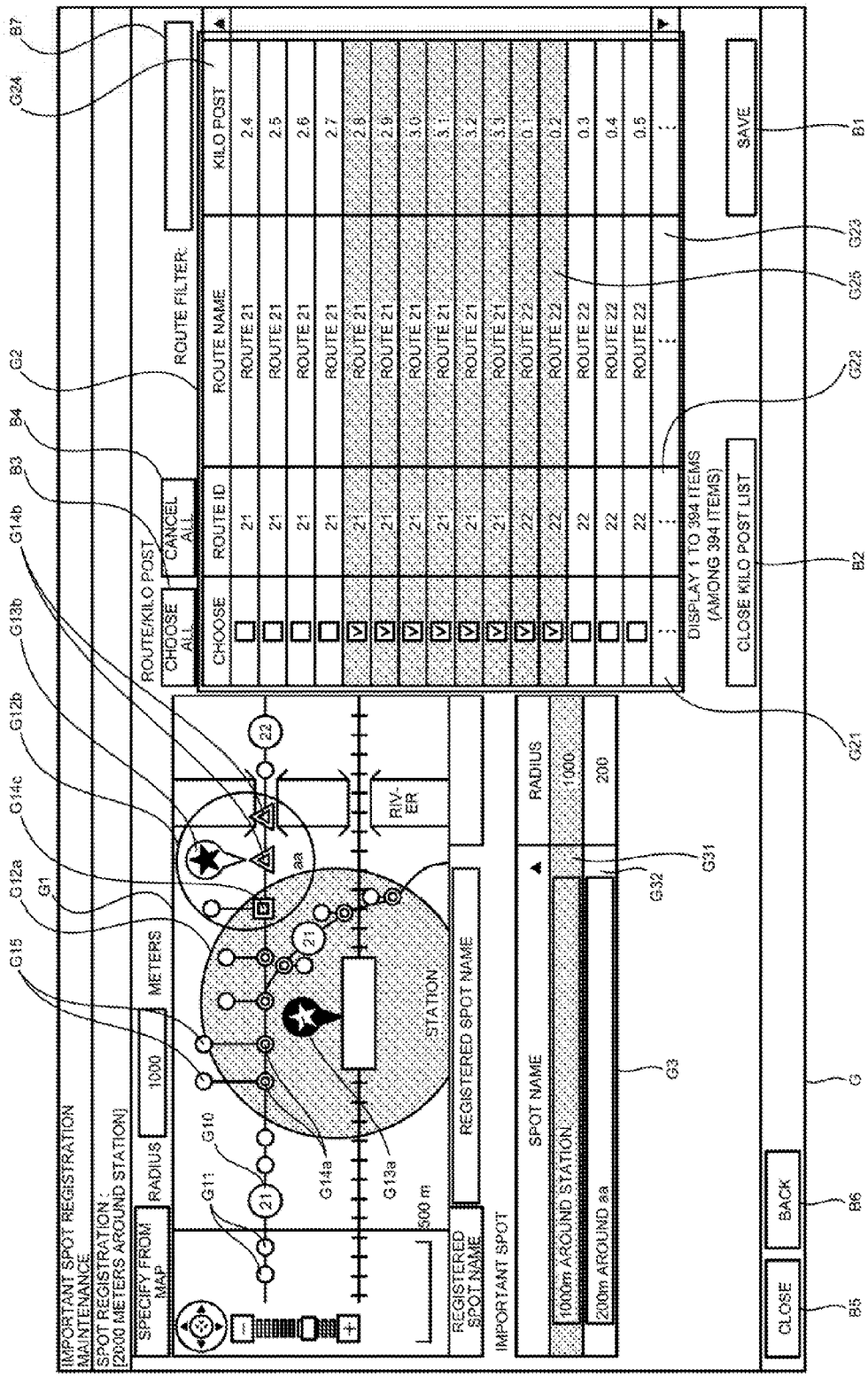
FIG. 5 is an illustration diagram illustrating the display screen.

FIG. 5 is an illustration diagram illustrating the display screen G. FIG. 5 is an illustration diagram of the display screen G that receives the setting of an important spot and an area affected by the important spot and reflects the content of the received setting.

As illustrated in FIG. 5, on the setting display G3, two important spots and the radii affected by the important spots are set. The information processing apparatus 100 implements central displays G13a and G13b in the corresponding positions on the graphic on the graphic display G1 with reference to the graphic-facility data D2 on the basis of the positions of the received two important spots. The information processing apparatus 100 also implements area displays G12a and G12b in the corresponding positions on the graphic on the graphic display G1 with reference to the graphic-facility data D2 on the basis of the radii affected by the two important spots.

The information processing apparatus 100 denotes the kilo posts on the routes within the area display G12a on the graphic with kilo post signs G14a different from the kilo post signs G11. Furthermore, the information processing apparatus 100 denotes the kilo posts on the route within the area display G12b on the graphic with kilo post signs G14b different from the kilo post signs G11 and G14a. Furthermore, the kilo post on the route within the area where the area display 12a and the area display G12b on the graphic overlap is denoted with a kilo post sign G14c different from the kilo post signs G11, G14a and G14b. As described above, the display mode of kilo post signs is changed according to whether each kilo post on the routes is within the area of the area display G12a or G12b or within the area where the area displays G12a and G12b overlap and accordingly the user is able to identify the area to which the kilo post of the route belongs.

The GUI operation covers "choosing" to make a choosing setting by choosing an important spot by specifying the rows G31 and G32, choosing a kilo post on the list display G2, and choosing a route by specifying a route by using the input box B7.

In the case of "choosing", the information processing apparatus 100 reflects the content of the received choosing to the graphic display G1 and the list display G2 (S18) and returns the process to S14. Accordingly, the user is able to check the content of the choosing setting according to the graphic display G1 or the list display G2.

The list display G2 displays the list of kilo posts contained in the area affected by the important spot. More specifically, the list display G2 displays a kilo post list table where one kilo post corresponds to one row. The list table includes columns G21, G22, G23 and G24.

In the column G21, for example, choosing boxes on each of which a setting on whether to choose each kilo post as a kilo post affected by the important spot is made are displayed. By making a setting on whether to choose by using the choosing boxes, the user is able to make a setting on whether each kilo post is affected by the important spot. In the columns G22 to G24, information, such as the route IDs, route names and kilo posts, acquired with reference to the graphic-facility data D2 is displayed.

Specifically, on the basis of the choosing in the rows G31 and G32, the information processing apparatus 100 makes a setting to choose kilo posts that belong to the area affected by the important spot. For example, when the row G31 is chosen as illustrated in FIG. 5, the information processing apparatus 100 chooses the kilo posts that belong to the area display G12a of the important spot corresponding to the row G31. Kilo posts that belong to the area display G12a may be chosen according to the environment described in the graphic-facility data D2 (for example, whether it is a one-way road). The information processing apparatus 100 displays choosing signs G15 for the kilo posts chosen on the graphic. The information processing apparatus 100 implements a choosing display G25 for the kilo posts chosen as those belonging to the area display G12a among the kilo posts in the list display G2 and turns the choosing boxes on in a column 21.

Figure 6:
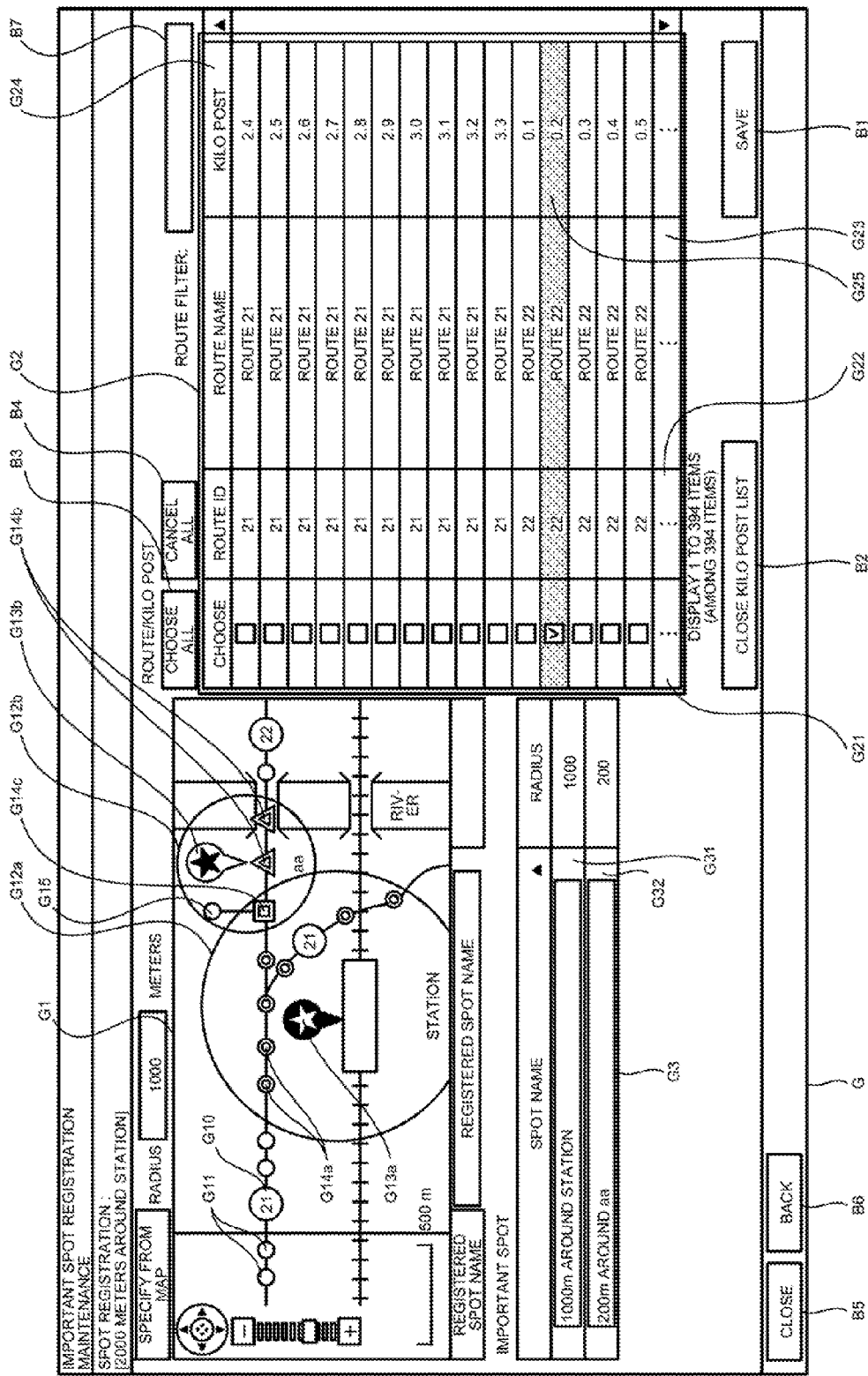
FIG. 6 is an illustration diagram illustrating the display screen.

The information processing apparatus 100 may make a setting to choose kilo posts according to the choosing of the kilo posts on the list display G2. FIG. 6 is an illustration diagram illustrating the display screen G. More specifically, FIG. 6 is a diagram illustrating a case where the choosing of a kilo post on the list display G2 is received.

As illustrated in FIG. 6, when a given kilo post (in the exemplary illustration, the 0.2 kilo post on Route 22) on the list display G2 is chosen, the information processing apparatus 100 implements the choosing display G25 on the chosen row and turns the choosing box on in the column G21. The information processing apparatus 100 then displays the choosing sign G15 for the kilo post sign corresponding to the kilo post chosen on the list display G2 among the kilo posts on the graphic.

Figure 7:
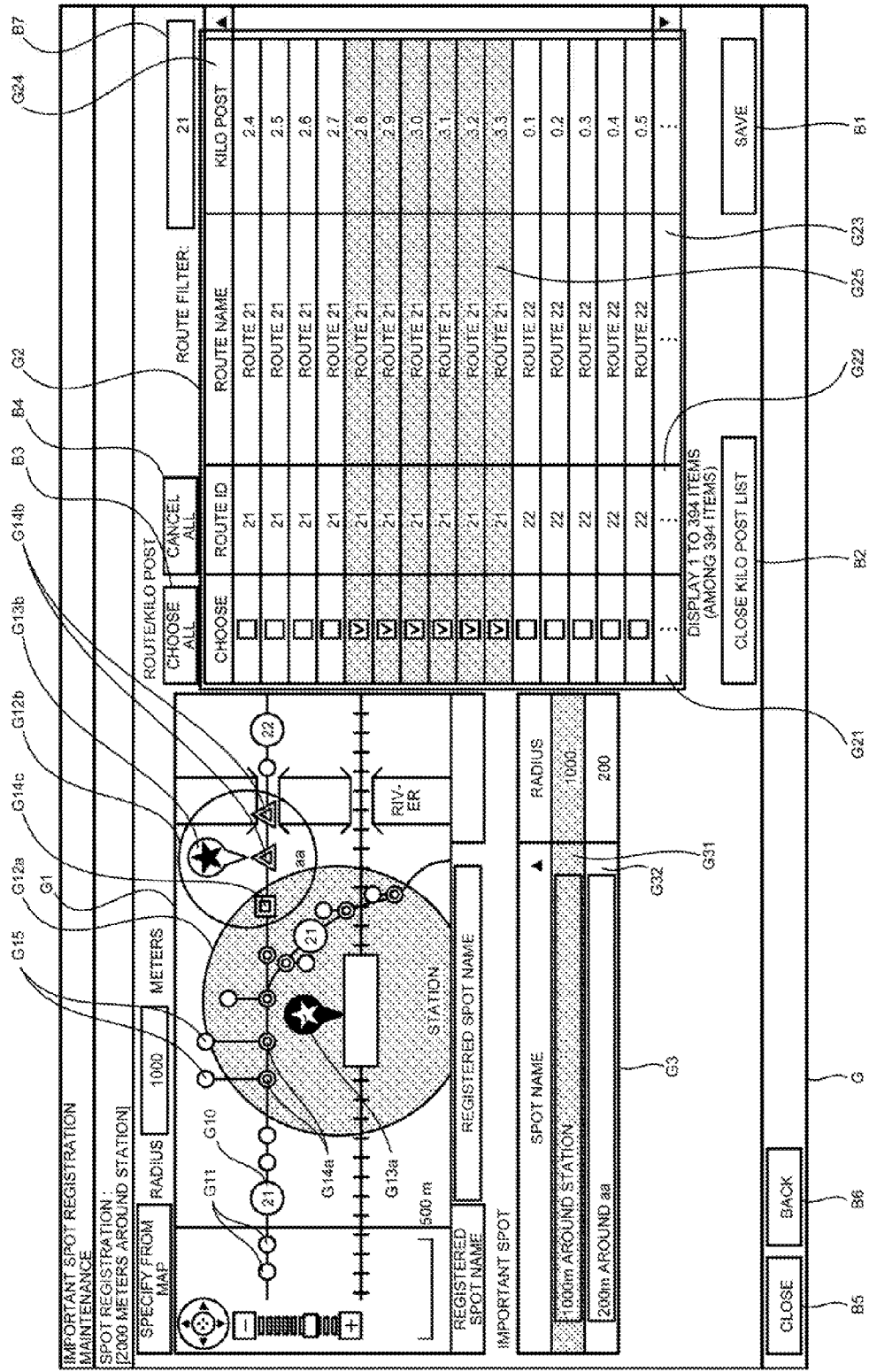
FIG. 7 is an illustration diagram illustrating the display screen.
Figure 8:
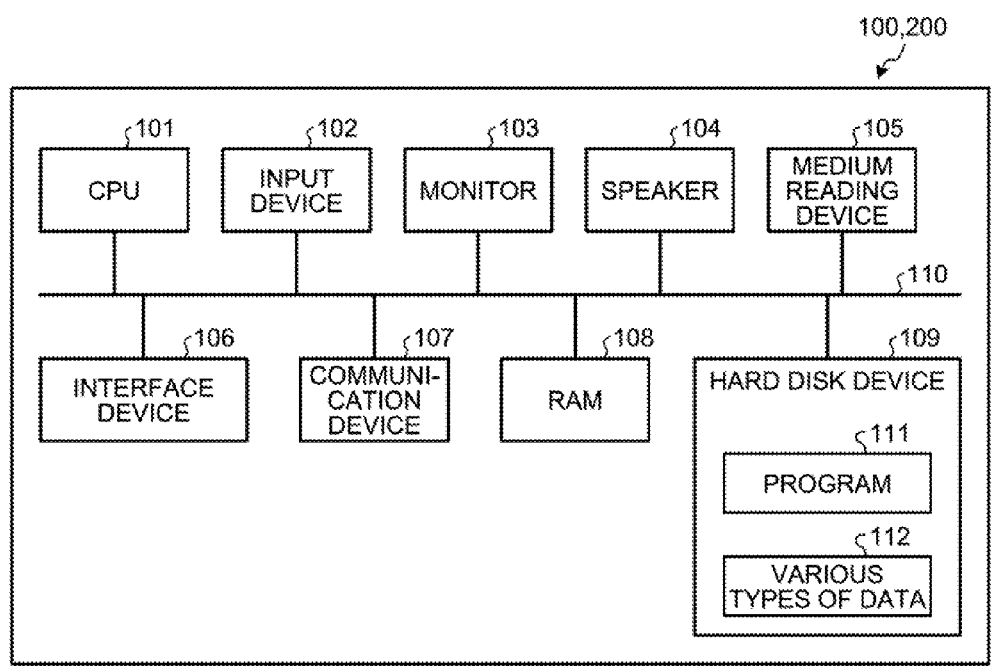
FIG. 8 is a block diagram illustrating an exemplary hardware configuration of the information processing apparatus.

The information processing apparatus 100 may make a setting to choose a kilo post by the choosing where the route is specified by using the input box B7. FIG. 7 is an illustration diagram illustrating the display screen G and, more specifically, is a diagram illustrating the setting to choose a kilo post in a case where a route is specified by using the input box B7.

As illustrated in FIG. 7, when a route (in the exemplary illustration, Route 21) is specified by using the input box B7, the information processing apparatus 100 acquires the specified route from the list display G2. The information processing apparatus 100 then extracts the kilo posts positioned in the area displays G12a and G12b among the kilo posts on the specified route with reference to the graphic-facility data D2. The information processing apparatus 100 then implements the choosing display G25 on the rows of the extracted kilo posts and turns on the choosing boxes in the column G21. The information processing apparatus 100 then displays the choosing signs G15 for the kilo post signs corresponding to the kilo posts chosen on the list display G2 among the kilo posts on the graphic. Accordingly, the user is able to make a setting to choose kilo posts positioned in the area displays G12a and G12b with respect to the specified route and check the content of the choosing according to the graphic display G1 or the list display G2.

The GUI operation covers "saving" the choosing setting. In the case of "saving", the information processing apparatus 100 saves the setting to choose each kilo post in the column G21 as setting data in the memory (S19) and ends the process.

FIG. 2 will be referred back. After S3, the information processing apparatus 100 determines the importance at each kilo post on the basis of the setting data obtained by registering important spots (S4). Specifically, the information processing apparatus 100 evaluates the importance at the kilo posts by stage (for example, in three stages A to C) by using a point plus system that adds a point when the kilo post is chosen as one affected by an important spot according to registration of the important spot.

For a kilo post that is chosen as one affected by the important spot in the setting data according to registration of the important spot, the information processing apparatus 100 adds points according to the type of important spot and the size of the area. For example, 20 points are added when the important spot is a facility with high importance, such as a hospital, a municipal office or a station and 10 points are added when the important spot is a facility with intermediate importance, such as a school or a library. Furthermore, 20 points are added when the area that is set in the registering of the important spot is larger than a given value and 10 points are added when the the area is smaller than the given value.

The information processing apparatus 100 evaluates the importance on the basis of the score with respect to the kilo post resulting from the adding of points according to the important spot. For example, the importance is evaluated as "C" when $0 \leq (\text{score}) \leq 50$-points, the importance is evaluated as "B" when $50 \leq (\text{score}) \leq 100$, and the importance is evaluated as "A" when $100 \leq (\text{score})$.

After receiving conditions on simulation, such as a route on which road works are to be implemented and a budget, the information processing apparatus 100 executes a budget simulation to calculate a combination of types of roadwork with respect to the kilo posts within a range where the received conditions are satisfied (S5).

Specifically, for the route on which roadworks are to be carried out, the information processing apparatus 100 selects a method with respect to each kilo post according to the level of degradation, amount of traffic and importance at each kilo post. For example, a costly method is selected with respect to a kilo post where the degradation proceeds and the importance is high. The information processing apparatus 100 calculates a work cost according to the methods selected for the respective kilo posts and calculates a combination of methods for the respective kilo posts within the budget. When multiple combinations are obtained, the durable years, etc., may be evaluated from the methods contained in the combination and the most highly evaluated combination may be used as a simulation result.

The information processing apparatus 100 displays the simulation result of the budget simulation described above and obtains an approval of the user via an operation on the GUI. The information processing apparatus 100 determines the simulation result approved by the user as a roadwork plan.

The information processing apparatus 100 then performs an ordering process for ordering works according to the roadwork plan that is determined in the budget simulation (S6). Specifically, the process of, for example, creating an application and registration with respect to the budget in the database is performed on the basis of the kilo posts on which it is determined that works are to be carried out, the methods, the budget, etc.

All or part of various processing functions implemented by the information processing apparatus 100 may be executed on a CPU (or a microcomputer, such as a MPU or a micro controller unit (MCU)). Needless to say, all or part of the various processing functions may be implemented on a program that is analyzed and executed by a CPU (or a microcomputer, such as a MPU or MCU) or on hardware using a wired logic.

It is possible to implement the various processes of the above-described embodiment by executing a program prepared in advance with a computer. An exemplary computer (hardware) that executes a program having the same functions as those of the above-described embodiment will be described below. FIG. 7 is a block diagram exemplifying a hardware configuration of the information processing apparatus 100 according to the embodiment.

As FIG. 7 illustrates, the information processing apparatus 100 includes a CPU 101 that executes various arithmetic operations, an input device 102 that receives data inputs, a monitor 103 and a speaker 104. The information processing apparatus 100 further includes a medium reading device 105 that reads, for example, a program from a storage medium, an interface device 106 for connection with various devices, and a communication device 107 for wired or wireless connection to communicate with external devices. The information processing apparatus 100 further includes a RAM 108 that temporarily stores various types of information and a hard disk device 109. Each unit (101 to 109) of the information processing apparatus 100 is connected to a bus 110.

In the hard disk device 109, a program 111 for executing the various processes of the above-described embodiment is stored. In the hard disk device 109, various types of data 112 (such as the road surface investigation data D1 or the graphic-facility data D2) for implementing the program 111 are stored. The input device 102 receives, for example, an input of operation information from an operator of the information processing apparatus 100. The monitor 103 displays, for example, various screens operated by the operator. To the interface device 106, for example, a printing device is connected. The communication device 107 is connected to a communication network, such as a local area network (LAN), and communicates various types of information with an external device via the communication network.

The CPU 101 reads the program 111 stored in the hard disk device 109, loads the program 111 into the RAM 108, and executes the program 111, thereby performing the various processes. The program 111 need not be stored in the hard disk device 109. For example, the information processing apparatus 100 may read the program 111 stored in a storage medium readable by the information processing apparatus 100 and execute the program. The storage medium readable by the information processing apparatus 100 corresponds to, for example, a portable recording medium, such as a CD-ROM, a DVD disk or a universal serial bus (USB) memory, a semiconductor memory, such as a flash memory, or a hard disk drive. The program may be stored in a device that is connected to the public line, the Internet or a LAN and the information processing apparatus 100 may read the program from the device and execute the program.

As described above, the information processing apparatus 100 displays the display screen G on which it is possible to set an area affected by the characteristic (for example, importance) of a road around an important spot, which is the area set based on the important spot. The information processing apparatus 100 further displays, on the graphic, kilo post signs each specifying a section of a road that is contained in the area affected by the characteristic relating to the important spot on the display screen G and that is affected by a possible selected type of repair work on the road according to the fact that the section belongs to the affected area. Accordingly, the information processing apparatus 100 makes it possible to easily check whether each kilo post of a route belongs to the affected area based on the important spot and affecting the type of roadwork and enables easy checking when a road work plan is drawn up.

According to the first embodiment, it is possible to enable easy checking when a roadworks plan is drawn up.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable recording medium having stored therein a program that causes a computer to execute a process comprising:
displaying a screen on which it is possible to set an area affected by a characteristic of a road around a specific facility, which is the area set based on the facility; and
displaying, on a graphic, information specifying a section of road that is contained in the area affected by the characteristic relating to the specific facility on the displayed screen and that is affected by a possible selected type of repair work on the road according to the fact that the section belongs to the affected area.

2. The non-transitory computer readable recording medium according to claim 1, wherein the process further comprises displaying, when a plurality of facilities are specified, a section of road contained in an area where the areas affected by the characteristics with respect to the facilities on the graphic on the displayed screen such that it is possible to distinguish the section of road from sections of road affected by possible selected types of repair work on roads according to the fact that the sections belong to the affected areas.

3. The non-transitory computer readable recording medium according to claim 1, wherein the process further comprises:
receiving specifying of a route; and
displaying the received route in the affected section of road such that it is possible to identify the route.

4. The non-transitory computer readable recording medium according to claim 1, wherein the process further comprises specifying the affected area by using a radius of a circle about the specific facility.

5. A road work planning method comprising:
displaying a screen on which it is possible to set an area affected by a characteristic of a road around a specific facility, which is the area set based on the facility, by a processor; and
displaying, on a graphic, information specifying a section of road that is contained in the area affected by the characteristic relating to the specific facility on the displayed screen and that is affected by a possible selected type of repair work on the road according to the fact that the section belongs to the affected area, by the processor.

6. The road work planning method according to claim 5, further comprising displaying, when a plurality of facilities are specified, a section of road contained in an area where the areas affected by the characteristics with respect to the facilities on the graphic on the displayed screen such that it is possible to distinguish the section of road from sections of road affected by possible selected types of repair work on roads according to the fact that the sections belong to the affected areas, by the processor.

7. The road work planning method according to claim 5, further comprising:
receiving specifying of a route, by the processor; and
displaying the received route in the affected section of road such that it is possible to identify the route, by the processor.

8. The road work planning method according to claim 5, further comprising specifying the affected area by using a radius of a circle about the specific facility, by the processor.

9. An information processing apparatus, comprising a processor that executes a process comprising:

displaying a screen on which it is possible to set an area affected by a characteristic of a road around a specific facility, which is the area set based on the facility; and displaying, on a graphic, information specifying a section of road that is contained in the area affected by the characteristic relating to the specific facility on the displayed screen and that is affected by a possible selected type of repair work on the road according to the fact that the section belongs to the affected area.

10. The information processing apparatus according to claim 9, wherein the process further comprises displaying, when a plurality of facilities are specified, a section of road contained in an area where the areas affected by the characteristics with respect to the facilities on the graphic on the displayed screen such that it is possible to distinguish the section of road from sections of road affected by possible selected types of repair work on roads according to the fact that the sections belong to the affected areas.

11. The information processing apparatus according to claim 9, wherein the process further comprises:

receiving specifying of a route; and displaying the received route in the affected section of road such that it is possible to identify the route.

12. The information processing apparatus according to claim 9, wherein the process further comprises specifying the affected area by using a radius of a circle about the specific facility.

\* \* \* \* \*